United States Patent Office 2,759,936
Patented Aug. 21, 1956

2,759,936
ISOQUINOLONE DERIVATIVES

Merrill Eugene Speeter, Kalamazoo, Mich., assignor to Bristol Laboratories Inc., Syracuse, N. Y., a corporation of New York No Drawing. Application February 18, 1953,
Serial No. 337,658

6 Claims. (Cl. 260—247.5)

This invention relates to a new class of organic compounds and methods of preparation thereof. More particularly, the invention relates to a series of substituted 2-alkyl-4-phenyl-1,2,3,4-tetrahydro-3-isoquinolones.

The new compounds include free bases, acid addition salts and quaternary salts, whose free bases may be represented by the following general formula:

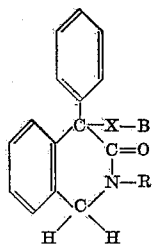

wherein R represents a lower alkyl radical containing one to six carbon atoms, X represents an alkylene radical containing two to four carbon atoms inclusive and B represents di-(lower alkyl)-amino, piperidino, morpholino, pyrrolidino, N'-alkylpiperazino or pipecolino.

The compounds of this invention are useful in medicine as anti-spasmodic agents. The free bases and acid addition salts are useful as intermediates in the preparation of the quaternary salts; the quaternary salts are useful as germicides and disinfectants.

The compounds of this invention are prepared by reacting 2-alkyl-4-phenyl-1,2,3,4-tetrahydro-3-isoquinolones, whose preparation is described in my co-pending application Serial Number 337,657, filed February 18, 1953, now abandoned, with lithium amide to form the lithio-derivatives and then reacting this lithio derivative with the appropriate alkyl-aminoalkyl halide.

The 2-alkyl-4-phenyl-1,2,3,4-tetrahydro-3-isoquinolones used as starting materials are prepared by reacting benzylamine or secondary benzylamines with acetylmandelyl-anilides to give O-acetal-N-benzylmandelamides which are reacted with sulfuric acid to give 4-phenyl-1,2,3,4-tetrahydro-3-isoquinolones according to the following equation wherein R represents lower alkyl containing one to six carbon atoms.

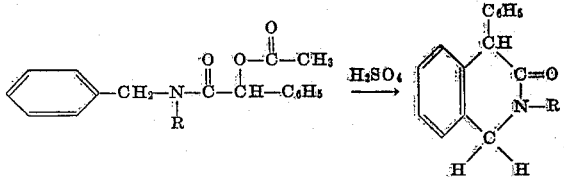

A specific example of the preparation of starting material of this type is as follows:

A. *O-acetyl-N-benzyl-N-methylmandelamide.*—To a solution of 182.8 g. (1.51 mole) of N-methyl-benzylamine in 1200 ml. of dry benzene is added 159 g. (0.75 mole) of acetylmandelyl chloride dropwise with shaking. The mixture is allowed to stand at room temperature for three hours and is then refluxed for three hours. The precipitate of amine hydrochloride is collected by filtration, washed with benzene and discarded. The filtrates and washings are combined and shaken with dilute hydrochloric acid and then with water. The dried toluene solution is distilled and the residue crystallized. The crystals obtained melt at 97.5°–99° C. after two recrystallizations from isopropyl alcohol.

Analysis.—Calculated for $C_{18}H_{19}NO_3$:

|   | Calculated | Found |
|---|---|---|
| C | 72.71 | 72.90 |
| H | 6.44 | 6.09 |

The following examples will serve to illustrate the invention without limiting it thereto.

EXAMPLE I

*2-methyl-4-phenyl-4-β-1-piperidylethyl-1,2,3,4-tetrahydro-3-isoquinolone*

Nineteen grams (0.08 mole) of 2-methyl-4-phenyl-1,2,3,4-tetrahydro-3-isoquinolone is refluxed for two hours with 3.45 g. (0.15 mole) of lithium amide in 250 ml. of dry toluene. A solution of 21.7 g. (0.15 mole) of piperidylethyl chloride is added in 200 ml. of toluene and the mixture refluxed for eighteen hours. The cooled mixture is poured into water and the toluene layer separated. The toluene layer is extracted with dilute hydrochloric acid. The acid extracts are cooled and made basic with ammonium hydroxide. The oil thus liberated from the acid extracts is extracted from ether. The ether is removed by distillation, leaving the product as the free base. Addition of sulfuric acid to a solution of the oil in isopropyl alcohol gives the sulfate salt. The salt crystallizes from isopropanol and melts at 241°–242° C.

Analysis.—Calculated for $C_{23}H_{28}N_2O \cdot H_2SO_4$:

|   | Calculated | Found |
|---|---|---|
| C | 61.78 | 62.10 |
| H | 6.77 | 6.60 |

*2-methyl-4-phenyl-4-piperidylethyl-1,2,3,4-tetrahydro-3-isoquinolone methiodide*

Five grams of 2-methyl-4-phenyl-4-piperidylethyl-1,2,3,4-tetrahydro-3-isoquinolone is dissolved in 100 ml. of dry ether and 7 ml. (excess) of methyl iodide is added. The yellow solid which separates on 18 hours standing is collected by filtration and recrystallized from methanol. The product crystallizes with one mole of methanol of crystallization and melts at 229°–230° C.

Analysis.—Calculated for $C_{24}H_{31}N_2OI \cdot CH_3OH$:

|   | Calculated | Found |
|---|---|---|
| C | 57.25 | 57.57 |
| H | 6.52 | 6.61 |

EXAMPLE II

*2-ethyl-4-phenyl-4-β-1-piperidylethyl-1,2,3,4-tetrahydro-3-isoquinolone*

The lithio derivative of 2-ethyl-4-phenyl-1,2,3,4-tetrahydro-3-isoquinolone is reacted with piperidylethyl chloride according to the procedure set forth in detail in Example I to give as a product the free base 2-ethyl-4-phenyl-4-piperidylethyl-1,2,3,4-tetrahydro-3-isoquinolone, which remains behind after concentration by distillation of its ethereal solution. This free base is converted to quaternary and acid addition salts by treatment with ethyl iodide and dilute, alcoholic hydrochloric acid respectively.

EXAMPLE III

2-methyl-4-phenyl-4-β-morpholinylethyl-1,2,3,4-tetrahydro-3-isoquinolone

Twenty grams of 2-methyl-4-phenyl-1,2,3,4-tetrahydro-3-isoquinolone is reacted with lithium chloride and β-morpholinylethyl chloride according to the directions of Example I. The basic oil isolated crystallizes on standing and is recrystallized from petroleum ether (B. P. 85°–100° C.) using 100 ml. of solvent per gram of product. The product melts at 136.5°–138° C.

Analysis.—Calculated for $C_{22}H_{26}N_2O_2$:

|   | Calculated | Found |
|---|---|---|
| C | 75.40 | 75.35 |
| H | 7.48 | 7.33 |

This free base is converted to quaternary and acid addition salts by treatment with excess n-propyl iodide and dilute, alcoholic citric acid respectively.

EXAMPLE IV

2-n-propyl-4-phenyl-4-β-morpholinylethyl-1,2,3,4-tetrahydro-3-isoquinolone

Following the procedure of Example I and using quantities of the reagents in the same molar ratio as therein, 2-n-proyl-4-phenyl-1,2,3,4-tetrahydro-3-isoquinolone is reacted first with lithium amide and then with β-morpholinylethyl chloride to give as a product the free base, 2 - n - propyl - 4 - phenyl - 4 - β - morpholinylethyl-1,2,3,4-tetrahydro-3-isoquinolone. This free base is converted to quaternary and acid addition salts by treatment with benzyl chloride and dilute, alcoholic tartaric acid respectively.

EXAMPLE V

2-methyl-4-phenyl-4-dimethylaminoethyl-1,2,3,4-tetrahydro-3-isoquinolone

Twenty grams of 2-methyl-4-phenyl-1,2,3,4-tetrahydro-3-isoquinolone is reacted with lithium amide and with dimethylaminoethyl chloride using the molar ratios and experimental procedure disclosed in Example I. The product is isolated as the free base and purified by distillation in vacuo, B. P. 187°–199° C./28–30 microns.

Analysis.—Calculated for $C_{20}H_{24}N_2O$:

|   | Calculated | Found |
|---|---|---|
| C | 77.88 | 76.91 |
| H | 7.84 | 7.76 |

This free base is converted to quaternary and acid addition salts by treatment with n-butyl bromide and dilute, alcoholic phosphoric acid respectively.

EXAMPLE VI

2-n-hexyl-4-phenyl-4-dimethylaminoethyl-1,2,3,4-tetrahydro-3-isoquinolone

Thirty grams of 2-n-hexyl-4-phenyl-1,2,3,4-tetrahydro-3-isoquinolone is reacted with lithium amide and with dimethylaminoethyl chloride using the molar ratios and experimental procedure disclosed in Example I. The product, 2-n-hexyl - 4 - phenyl - 4 - dimethylaminoethyl-1,2,3,4-tetrahydro-3-isoquinolone, is isolated as the free base, purified by distillation in high vacuum, and converted to quaternary and acid addition salts by treatment with n-hexyl iodide and dilute, alcoholic sulfamic acid respectively.

EXAMPLE VII

2-methyl-4-phenyl-4-diethylaminoethyl - 1,2,3,4 - tetrahydro-3-isoquinolone

The procedure of Example I is followed, with the piperidylethyl chloride replaced by diethylaminoethyl chloride. The product, 2-methyl-4-phenyl-4-diethylaminoethyl-1,2,3,4-tetrahydro-3-isoquinolone, is isolated as the free base and purified by distillation in vacuo (B. P. 216°–221° C./2.5 mm.).

Analysis.—Calculated for $C_{22}H_{28}N_2O$:

|   | Calculated | Found |
|---|---|---|
| C | 78.54 | 78.70 |
| H | 8.39 | 7.95 |

The free base is converted to quaternary and acid addition salts by treatment with 1-bromo-2-ethylhexane and dilute, alcoholic acetic acid respectively.

EXAMPLE VIII

2 - iso-butyl-4-phenyl - 4 - diethylaminoethyl - 1,2,3,4-tetrahydro-3-isoquinolone The procedure of Example I is followed, using 2-isobutyl - 4 - phenyl-1,2,3,4-tetrahydro-3-isoquinolone and diethylaminoethyl chloride. The product, 2-iso-butyl-4-phenyl-4 - diethylaminoethyl - 1,2,3,4 - tetrahydro-3-isoquinolone, is isolated as the free base, purified by distillation in high vacuum and converted to quaternary and acid addition salts by treatment with isobutyl bromide and dilute, alcoholic succinic acid respectively.

The invention also includes the non-toxic organic and inorganic acid addition salts of the compounds having the general formula above such as will be readily formed with, for example, organic and inorganic acids such as hydrochloric, sulfuric, sulfamic, tartaric, hydrobromic, hydriodic, glycolic, citric, maleic, phosphoric, succinic, acetic, benzoic, cinnamic, mandelic, malic, ascorbic, and the like. The method of preparation of these salts is made apparent in the examples above.

This invention also contemplates the quarternary salts of the free bases of the general formula above, which may be prepaired as made apparent in the examples above by treatment of the free bases with quaternary salt-forming substances. These quaternary salt-forming substances include methyl chloride, methyl bromide, methyl iodide, ethyl chloride, ethyl bromide, ethyl iodide, n-propyl chloride, n-propyl bromide, n-propyl iodide, isopropyl bromide, n-butyl chloride, n-butyl bromide, isobutyl bromide, sec.-butyl bromide, n-amyl bromide, n-hexyl chloride, benzyl chloride, benzyl bromide, methyl sulfate, ethyl sulfate, methyl benzenesulfonate, methyl p-toluenesulfonate, etc. which will react directly with any free base of the general formula above to give respectively the methochloride, methobromide, methiodide, ethochloride, ethobromide, ethiodide, n-propochloride, n-propobromide, n-propiodide, isopropobromide, n-butochloride, n-butobromide, isobutobromide, sec.-butobromide, n-amobromide, n-hexochloride, benzochloride, benzobromide, methosulfate, ethosulfate, methobenzenesulfonate, metho-p-toluenesulfonate, etc.

In this invention, lithuim amide is used, for example, to prepare in situ the lithio salt of the 2-methyl-, 2-ethyl-, 2-isopropyl-, 2-n-propyl-, 2-n-butyl-, 2-sec.-butyl-, 2-isobutyl-, 2-isoamyl-, 2-n-amyl-, 2-isohexyl-, 2-n-hexyl-, and 2-beta-ethyl-n-butyl-4-phenyl-1,2,3,4-tetrahydro - 3 - isoquinolones, etc. according to the procedure described in detail in the examples above.

The lithio derivatives thus prepared are alkylated in situ on the 4-carbon by such tertiary aminoalkyl halides, for example, as beta-dimethylaminoethyl chloride, gamma-dimethylaminopropyl chloride, beta-ethylmethylaminoethyl chloride, gamma-ethylmethylaminopropyl bromide, beta-diethylaminoethyl bromide, gamma-diethylaminopropyl bromide, beta-dipropylaminoethyl iodide, gamma-dipropylaminopropyl iodide, beta - dibutylaminoethyl chloride, gamma-dibutylaminopropyl bromide, beta-1-piperidylethyl chloride, gamma-1-piperidylpropyl bromide, beta - 1 - α - pipercolylethyl chloride, gamma - 1 - γ - pipecolylpropyl bromide, beta - 1 - pyrrolidylethyl chloride, gamma - 1 - pyrrolidylpropyl bromide, beta-1-(4-methylpiperazyl)ethyl chloride, gamma-1-(4-ethylpiperazyl)propyl bromide, beta-1-morpholinylethyl chloride, gamma-(1-morpholinyl)propyl bromide, beta-dimethylamino-n-propyl chloride, beta - 1 - piperidyl-n-propyl bromide, beta-1-morpholinyl-n-propyl chloride, beta-diethylamino - α - methylethyl chloride, beta - 1 - (4-methylpiperazyl)-α-methylethyl chloride, beta-di-n-propylamino-α,β-dimethylethyl chloride, beta-1-γ-pipecolyl-α,β-dimethyl-ethyl chloride, beta-dimethyl-amino-n-butyl bromide, beta-1-pyrrolidyl-n-butyl bromide etc. according to the procedures given in detail in the examples above.

Thus, the lithio derivatives of the substituted 4-phenyl-1,2,3,4-tetrahydro-3-isoquinolones of the second preceding paragraph may be employed, for example, as follows: 2-methyl-4-phenyl-1,2,3,4-tetrahydro-3-isoquinolone with beta - 1 - (4 - methylpiperazyl) - α - methyl-ethyl chloride to give 2 - methyl - 4 - phenyl - 4 - [beta-1 - (4-methylpiperazyl) - α - methyl - ethyl] - 1,2,3,4 - tetrahydro - 3 - isoquinolone, 2 - methyl - 4 - phenyl - 1,2,3,4-tetrahydro - 3 - isoquinolone with beta - 1 - pyrrolidyl-n-butyl bromide to give 2-methyl-4-phenyl-4-[beta-(1-pyrrolidyl) - n - butyl] - 1,2,3,4 - tetrahydro - 3 - isoquinolone, 2 - ethyl - 4 - phenyl - 1,2,3,4 - tetrahydro-3 - isoquinolone with beta - dimethylamino - n - butyl bromide to give 2 - ethyl - 4 - phenyl - 4 - [beta - dimethylamino - n - butyl] - 1,2,3,4 - tetrahydro - 3 - isoquinolone, 2 - ethyl - 4 - phenyl - 1,2,3,4 - tetrahydro-3-isoquinolone with beta - 1 - γ - pipecolyl - α,β - dimethylethyl - chloride to give 2 - ethyl - 4 - phenyl - 4 - [beta-1 - γ - pipecolyl - α,β - dimethyl - ethyl] - 1,2,3,4 - tetrahydro - 3 - isoquinolone, 2 - isopropyl - 4 - phenyl - 1,2,3,4 - tetrahydro - 3 - isoquinolone with beta - di - n-propylamino - α,β - dimethyl - ethyl chloride to give 2-isopropyl - 4 - phenyl - 4 - [beta - di - n - propylamino-α,β - dimethyl - ethyl] - 1,2,3,4 - tetrahydro - 3 - isoquinolone, 2 - isopropyl - 4 - phenyl - 1,2,3,4 - tetrahydro-3 - isoquinolone with beta - 1 - morpholinyl - n - propyl chloride to give 2 - isopropyl - 4 - phenyl - 4 - (beta - 1-morpholinyl - n - propyl) - 1,2,3,4 - tetrahydro - 3 - isoquinolone, 2 - n - propyl - 4 - phenyl - 1,2,3,4 - tetrahydro - 3 - isoquinolone with gamma - (1 - morpholinyl)-propyl bromide to give 2 - n - propyl - 4 - phenyl - 4 - [gamma - (1 - morpholinyl)propyl] - 1,2,3,4 - tetrahydro - 3 - isoquinolone, 2 - n - propyl - 4 - phenyl - 1,2,34-tetrahydro - 3 - isoquinolone with gamma - 1 - (4 - ethylpiperazyl)propyl bromide to give 2 - n - propyl - 4 - phenyl - 4 - [gamma - 1 - (4 - ethylpiperazyl) - propyl]-1,2,3,4 - tetrahydro - 3 - isoquinolone, 2 - isoamyl - 4-phenyl - 1,2,3,4 - tetrahydro - 3 - isoquinolone with beta-1 - (4 - methylpiperazyl)ethyl chloride to give 2 - isoamyl-4 - phenyl - 4 - [beta - 1 - (4 - methylpiperazyl)ethyl]-1,2,3,4 - tetrahydro - 3 - isoquinolone, 2 - n - amyl - 4-phenyl - 1,2,3,4 - tetrahydro - 3 - isoquinolone with gamma - 1 - pyrrolidylpropyl bromide to give 2 - n - amyl-4 - phenyl - 4 - [gamma - (1 - pyrrolidyl) - propyl] - 1,2,3,4 - tetrahydro - 3 - isoquinolone, 2 - isohexyl - 4-phenyl - 1,2,3,4 - tetrahydro - 3 - isoquinolone with beta-diethylamino - α - methyl - ethyl chloride to give 2 - isohexyl - 4 - phenyl - 4 - [beta - diethylamino - α - methylethyl] - 1,2,3,4 - tetrahydro - 3 - isoquinolone, 2 - beta ethyl - n - butyl - 4 - phenyl - 1,2,3,4-tetrahydro - 3-isoquinolone with gamma - dipropylaminopropyl iodide to give 2 - (beta - ethyl - n - butyl) - 4 - phenyl - 4 - [gamma - dipropylamino - propyl] - 1,2,3,4 - tetrahydro-3 - isoquinolone, etc. in accordance with the detailed directions of the examples above.

I claim:

1. A member selected from the group consisting of compounds having the structure

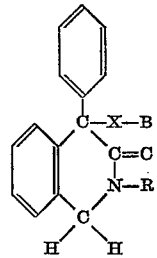

wherein R represents a lower alkyl radical containing one to six carbon atoms, X represents an alkylene radical containing two to four carbon atoms inclusive and B represents a member selected from the group consisting of di-(lower)-alkyl-amino, piperidino, morpholino, pyrrolidino, and pipecolino; and acid addition salts and quaternary salts of said compounds.

2. 2 - methyl - 4 - phenyl - 4 - β - piperidylethyl-1,2,3,4 - tetrahydro - 3 - isoquinolone.

3. 2 - methyl - 4 - phenyl - 4 - β - piperidylethyl-1,2,3,4 - tetrahydro - 3 - isoquinolone methiodide.

4. 2 - methyl - 4 - phenyl - 4 - β - morpholinylethyl-1,2,3,4 - tetrahydro - 3 - isoquinolone.

5. 2 - methyl - 4 - phenyl - 4 - β - dimethylaminoethyl-1,2,3,4 - tetrahydro - 3 - isoquinolone.

6. 2 - methyl - 4 - phenyl - 4 - β - diethylaminoethyl-1,2,3,4 - tetrahydro - 3 - isoquinolone.

No references cited.